United States Patent [19]

Tokushige et al.

[11] Patent Number: 5,396,601
[45] Date of Patent: Mar. 7, 1995

[54] MICROPROCESSOR SYSTEM HAVING A SINGLE, COMMON INTERNAL BUS TRANSFERRING DATA AND INSTRUCTIONS IN DIFFERENT STATES OF A MACHINE CYCLE

[75] Inventors: Tetsuya Tokushige; Nobuyoshi Yanagita, both of Miyazaki; Koji Tanagawa; Jiro Kobayashi, both of Tokyo, all of Japan

[73] Assignee: Oki Electric Industry Co., Ltd., Tokyo, Japan

[21] Appl. No.: 42,468

[22] Filed: Apr. 5, 1993

Related U.S. Application Data

[63] Continuation of Ser. No. 540,378, Jun. 19, 1990, abandoned.

[30] Foreign Application Priority Data

Jun. 21, 1989 [JP] Japan .................................. 1-159321

[51] Int. Cl.$^6$ .............................................. G06F 13/00
[52] U.S. Cl. .............................. 395/325; 364/228.5; 364/260.1; 364/240.5; 364/240; 364/DIG. 1; 395/800
[58] Field of Search ........................... 395/325, 800, 275

[56] References Cited

U.S. PATENT DOCUMENTS

| | | | |
|---|---|---|---|
| 4,025,368 | 6/1991 | Watanabe | 395/275 |
| 4,144,589 | 3/1979 | Baker | 365/203 |
| 4,177,511 | 12/1979 | Taddei | 395/275 |
| 4,439,839 | 3/1984 | Kneib | 364/900 |
| 4,639,861 | 1/1987 | Appiano | 364/200 |
| 4,665,483 | 12/1987 | Ciacci | 395/325 |
| 4,720,783 | 1/1988 | Roth | 364/200 |
| 4,969,121 | 11/1990 | Chan | 395/325 |
| 5,012,404 | 4/1991 | Pressplich | 395/800 |
| 5,084,814 | 1/1992 | Vaglica | 395/325 |
| 5,321,845 | 6/1994 | Sawase | 395/800 |

OTHER PUBLICATIONS

Titus, J., "EDN's 15th Annual $\mu P/\mu U$ Chip Directory", Electrical Design News, vol. 33, No. 22, pp. 164–270 (Oct. 1988).
Harrington et al., "A GaAs 32-bit RISC Microprocessor", 10th Annual GaAs IC Symposium, Technical Digest, pp. 87–90 (Nov. 1988).
EL-Amawy et al., "Dynamic Architectures for Microcomputers", Computer Standards & Interfaces, vol. 6, No. 4, pp. 463–469 (1987).

*Primary Examiner*—Eric Coleman
*Attorney, Agent, or Firm*—Edward D. Manzo

[57] ABSTRACT

A CPU core includes an internal resource made up of various kinds of registers, and a controller having a bus control circuit which controls the input and output of data and others among various kinds of buses. A terminal group has a plurality of terminals for interconnecting the CPU core to a peripheral circuit and an external memory. The buses comprise an internal bus to which individual circuits incorporated in the CPU core are interconnected, a data bus interconnected between the CPU core and the external memory for allowing data to be inputted and outputted between the CPU core and the external memory, and a peripheral data bus inerconnected between the CPU core and the peripheral circuit for allowing data to be inputted and outputted between the CPU core and the peripheral circuit. The input and output terminals of all of the circuit portions which constitute the internal resource are interconnected to the internal bus. The bus control circuit has input and output terminals interconnected to the internal bus, data bus, and peripheral data bus for controlling the input and output of data and others among the buses.

7 Claims, 8 Drawing Sheets

MICROPROCESSOR SYSTEM HAVING A SINGLE, COMMON INTERNAL BUS TRANSFERRING DATA AND INSTRUCTIONS IN DIFFERENT STATES OF A MACHINE CYCLE

This is a continuation, of application Ser. No. 07/540,378, filed Jun. 19, 1990 now abandoned.

BACKGROUND OF THE INVENTION

1. Field of the Invention

The present invention relates to a CPU (Central Processing Unit) core suitable for use in a single-chip microcomputer and which is operable at high speed and small in chip size.

2. Description of the Prior Art

In the field of the art to which the present invention pertains, elaborate technologies have been reported by Yamads et al in "8-Bit Flexible Microcontroller", the Institute of Electronics and Communication Engineers of Japan, Materials for Study Meeting, SSD86-92, pp. 7-12, 1986 (hereinafter referred to as document 1), and also reported in "Opening of CPU Core ASIC Age", Nikkei Microdevices, No. 1989-1, pp. 35-43, BP Company (hereinafter referred to as document 2).

There is an increasing demand for a single-chip microcomputer which allows peripheral circuits matching particular applications to be built therein without consuming a long time for development. To meet such a demand, the document 1 proposes a core device in the form of a CPU core to which desired peripheral circuits may be interconnected according to the user's needs. This kind of single-chip microcomputer or so-called ASIC microcomputer chip will have optimum specifications matching a desired application.

A CPU core intended for the above purpose has to adapt itself to various kinds of applications. Hence, prerequisites with such a CPU core are, among others, rapid operation processing, extended design freedom, ease of connection of peripheral circuits, small exclusive area, a broad operable range (voltage, temperature and so forth). The document 1 teaches a CPU core made up of various blocks such as a CPU block, an interrupt control block, an input/output control block, and a RAM, and configured to execute instruction processing by sixteen bits for the purpose of promoting high-speed operations.

However, a CPU core having the above configuration has some problems left unsolved. Namely, increasing the processing speed and reducing the exclusive area for a CPU core are contradictory to each other. Fetching an instruction from a ROM, executing pipeline processing, and providing the processing system with a 16-bit width as disclosed in the document 1 are typical approaches available for enhancing high-speed operations. However, all of such approaches would complicate the hardware of an 8-bit microcomputer and would increase the exclusive area for the CPU core due to the increase in processing speed.

The prior art CPU core includes RAMs, clock generators, and various control circuits therein and is satisfactory so long as a desired application can be implemented by the specifications of such built-in components. However, when the specifications cannot meet the user's demand, e.g. , when the number of RAMS should be increased or decreased or when the specifications of the control circuits should be changed, it is necessary to redesign the portions of the CPU core where the specifications should be changed and to adequately distribute the functions to the CPU core and the peripheral circuits to be connected to the CPU core. This kind of CPU core, therefore, is not fully satisfactory when it comes to the ease of connection of peripheral circuits and the design freedom available for the peripheral circuits.

Hence, the configuration of a CPU core has decisive influence on the design freedome of peripheral circuits and the chip size. When a CPU core has a great number of components, the user-oriented selectable range of specifications is extremely limited and the chip size is increased. The resultant CPU core would be contrary to the intention, i.e. , a broad range of applications. If the number of components of a CPU is relatively small, the design freedom of peripheral circuits will be enhanced and the chip-size will be reduced. Such a CPU, however, would increase the user's burden concerning the design of peripheral circuits and would require manifold know-hows on CPUs for the connection of peripheral circuits to the CPU core. This impedes the reduction of developing time which is the object of an ASIC microcomputer. Thus, a CPU core for an ASIC microcomputer which allows various kinds of peripheral circuits to be efficiently and easily connected thereto, i.e. , which has ample design freedom has not been reported yet.

SUMMARY OF THE INVENTION

It is therefore an object of the present invention to provide a CPU core which is operable at high speed and occupies a minimum of exclusive area, enhances the design freedom of peripheral circuits, and promotes the ease of connection with peripheral circuits.

A CPU core of the present invention includes an internal resource made up of various kinds of registers, and a controller a bus control circuit which controls the input and output of data and others among various kinds of buses. A terminal group has a plurality of terminals for interconnecting the CPU core to a peripheral circuit and an external memory. The buses comprise an internal bus to which individual circuits incorporated in the CPU core are interconnected, a data bus interconnected between the CPU core and the external memory for allowing data to be inputted and outputted between the CPU core and the external memory, and a peripheral data bus interconnected between the CPU core and the peripheral circuit for allowing data to be inputted and outputted between the CPU core and the peripheral circuit. The input and output terminals of all of the circuit portions constituting the internal resource are interconnected to the internal bus. The bus control circuit has input and output terminals interconnected to the internal bus, data bus, and peripheral data bus for controlling the input and output of data and others among the buses.

The present invention enhances efficient manipulation of peripheral circuits, reduces the chip size, and allows desired peripheral circuits to be designed with greater freedom than the prior art.

In accordance with the present invention, the bus control circuit eliminates the problem particular to a CPU having a single bus structure as will be described, speeds up processing, and reduces chip size. Further, the bus control circuit precharges the peripheral data bus prior to the input of data from the peripheral data bus, whereby the individual peripheral circuits are desirably scaled down and the data interchange is sped up.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENT

Figure 1A:
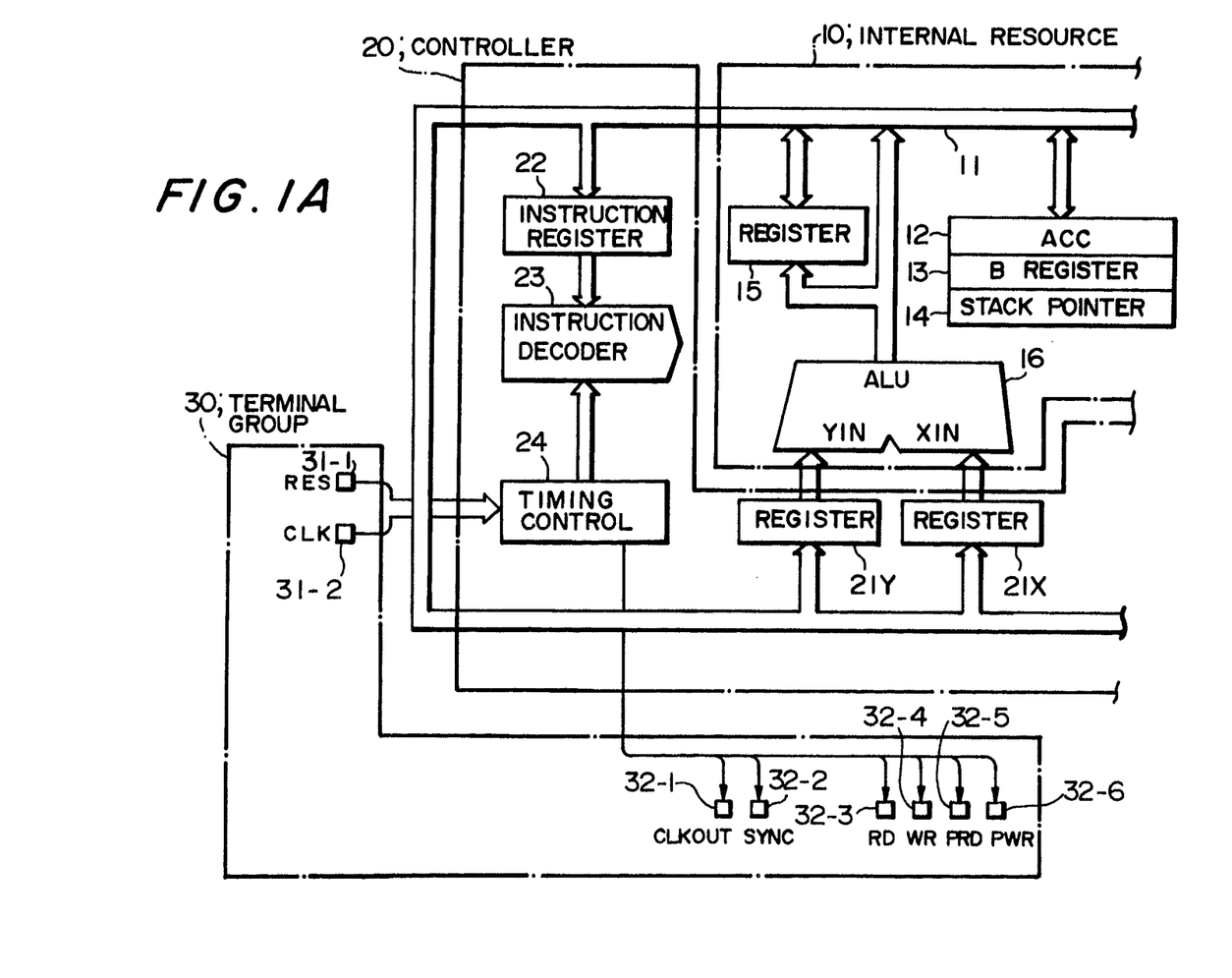
FIGS. 1A and 1B are block diagrams schematically showing a CPU core embodying the present invention.
Figure 1B:
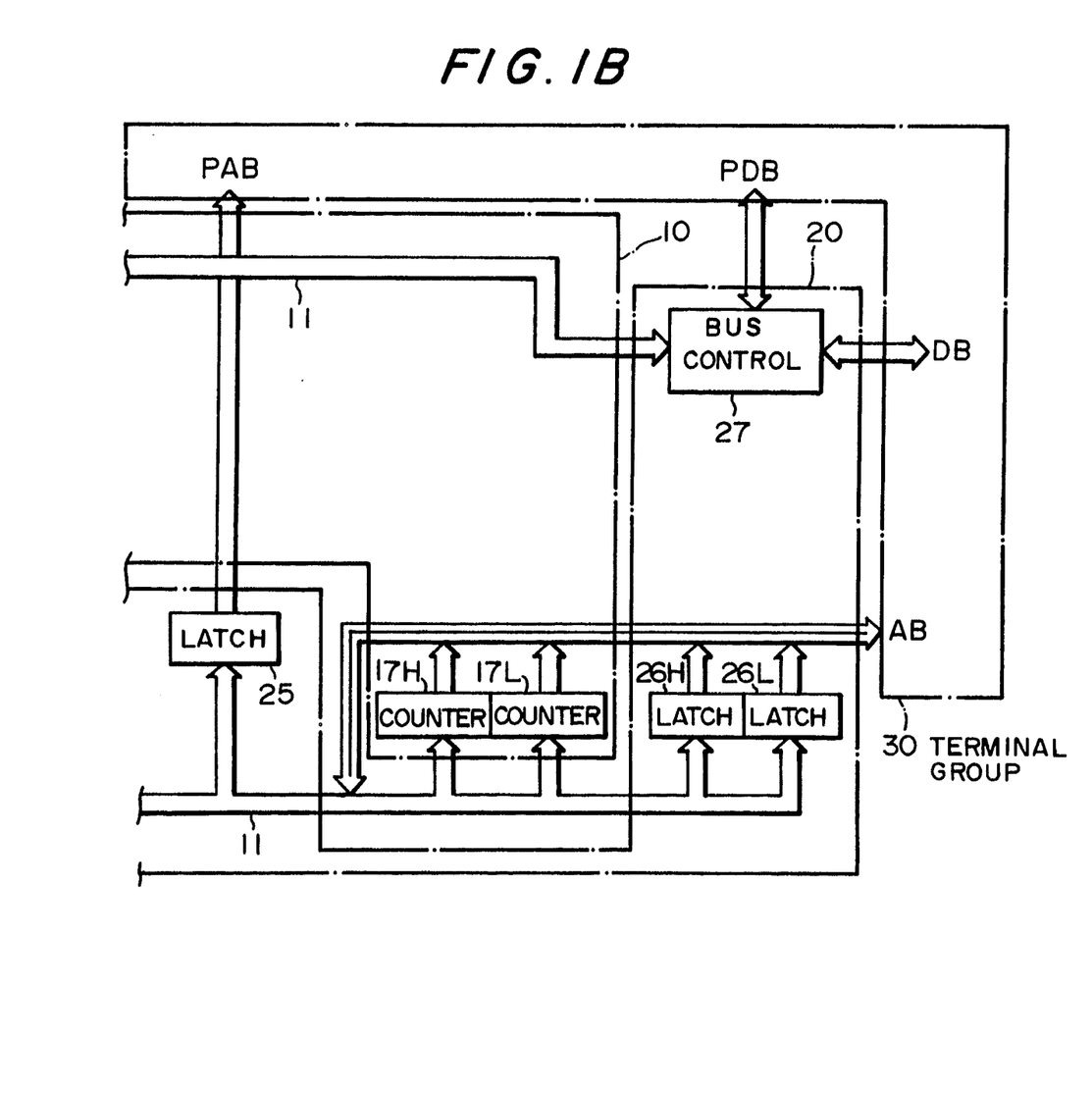

Referring to FIGS. 1A and 1B of the drawings, a CPU core embodying the present invention is shown. As shown, the CPU core has an internal resource 10 having registers which are interconnected to a single internal bus 11 in a so-called single bus configuration. A controller 20 supervises the entire CPU core by decoding instructions and delivering various kinds of control signals. The controller 20 interchanges signals with the outside of the CPU core.

The internal resource 10 has an accumulator (ACC) 12 for storing the results of arithmetic and logical operations, a B register 13 which is a general-purpose working register, a stack pointer 14 for pointing a location of a stack memory or similar storage from which data should be read out, a condition code register 15, an arithmetic and logic unit (ALU) 16 for performing arithmetic and logic operations, an upper program counter 17H and a lower program counter 17L for memorizing the location of an instruction which should be read out next, etc. All these components of the internal resource 10 are interconnected to the internal bus 11.

The controller 20 has temporary registers 21X and 21Y each for temporarily storing data, an instruction register 22 for temporarily storing an instruction, an instruction decoder 23 for decoding an instruction lodged in the instruction register 22 to generate various kinds of control signals, a timing control circuit 24, a peripheral address latch 25 for latching a peripheral address (address of a peripheral circuit), an upper external memory address latch 26H and a lower external memory address latch 26L for latching an address of an external memory, and a bus control circuit 27.

The timing control circuit 24 is operated by a reset signal RES and a clock signal CLK which are fed thereto from the outside and, in turn, generates timing signals $\phi1$ to $\phi4$ which are necessary for the execution of instructions and other various control timing signals meant for various sections of the CPU core. Further, the timing control circuit 24 delivers to the outside a synchronizing signal SYNC which is a timing signal for causing a peripheral circuit or similar circuit into connection with the CPU core, a clock output signal CLKOUT, an input timing signal $\overline{RD}$, an output timing signal $\overline{WR}$, an input timing signal $\overline{PRD}$ assigned to peripheral data, an output timing signal $\overline{PWR}$ also assigned to peripheral data, etc. The bus control circuit 27 is interconnected between the internal bus 11 and a data bus DB and a peripheral data bus PDB so as to control the input and output of data thereto.

The terminal group 30 has terminals 31-1 and 31-2 to which the reset signal RES and clock signal CLK are respectively applied as control inputs, and terminals 32-1 to 32-6 from which the clock output signal CLKOUT, synchronizing signal SYNC, input timing signal $\overline{RD}$, output timing signal $\overline{WR}$, peripheral input timing signal $\overline{PRD}$, and peripheral output timing signal $\overline{PWR}$ are fed out as timing outputs. The terminal group 30 also has an output terminal assigned to the address bus AB, an input and an output terminal assigned to the data bus DB, an output terminal assigned to a peripheral address bus PAB, and an input and an output terminal assigned to a peripheral data bus PDB, all of which are collectively represented by a single block in FIG. 1B and adapted for the connection with the outside.

The operation of the CPU core having the above construction will be described with reference to FIG. 2 and by taking the execution of a relatively simple addition instruction as an example.

Figure 2:
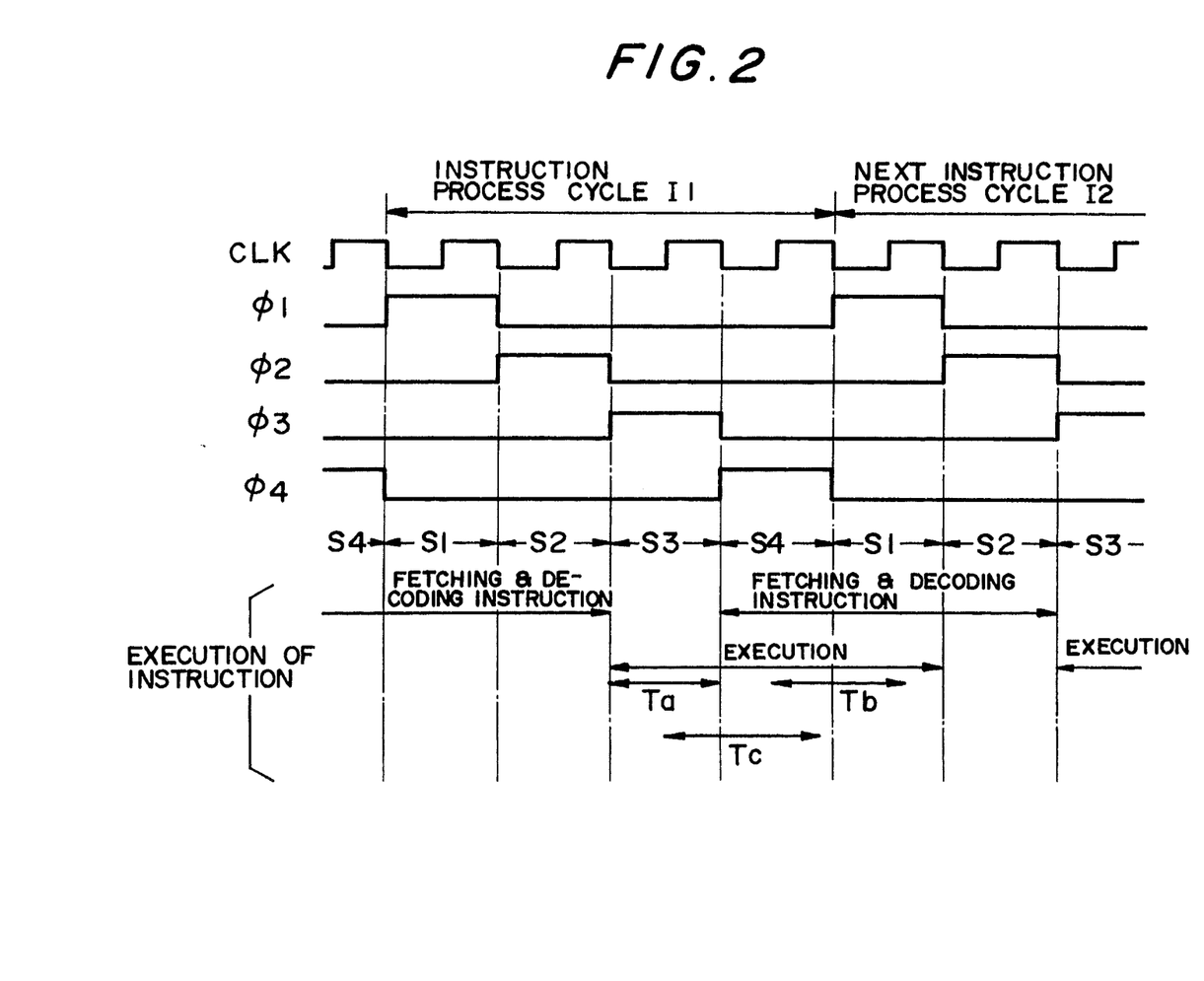
FIG. 2 is a timing chart demonstrating a specific operation of the CPU core of FIGS. 1A and 1B for executing an instruction.

In FIG. 2, successive instruction processing cycles I1, I2 and so forth each is constituted by four successive timing states S1 to S4 which occur in synchronism with the basic timing signals $\phi1$ to $\phi4$, respectively. In the timing state S4 of the instruction processing cycle which immediately precedes the cycle I1 and the timing states S1 and S2 of the cycle I1, an instruction is fetched from an external memory, not shown, to the instruction register 22 via the data bus DB, bus control circuit 27, and internal bus 11. The address of the external memory is indicated by the program counters 17H and 17L and fed to the external memory over the address bus AB.

The instruction decoder 23 decodes the instruction and, based on the result of decoding, generates control timing signals meant for various sections of the CPU core. Then, processing conforming to the instruction is executed in response to such control timing signals in the timing states S3 and S4 of the instruction processing cycle I1 and the timing state S3 of the following instruction processing cycle I2. The basic timing signals $\phi1$ to $\phi4$ which the instruction decoder 23 needs are fed from the timing control circuit 24.

In the event of the execution of an addition instruction, the instruction is fetched and decoded as stated earlier in the timing state S4 of the instruction processing cycle immediately preceding the cycle I1 and the timing states S1 and S2 of the cycle I1. During the period of time Ta allocated to the timing state S3 of the instruction processing cycle I1, data from a peripheral circuit, not shown, which is interconnected to the outside of the CPU core is loaded in one temporary register 21Y via the peripheral data bus PDB, bus control circuit 27, and internal bus 11. Assume that one of two different data to be added together has already been loaded in the other temporary register 21X by the execution of an instruction prior to the execution of the addition instruction.

During the period of time Tc of the timing states S3 and S4 of the instruction processing cycle I1, the ALU 16 adds the data stored in the temporary registers 21Y and 21X. During a period of time Tb of the timing states S4 and S1 of the instruction processing cycles I1 and I2, respectively, the result of addition is outputted to the peripheral data bus PDB via the internal bus 11 and bus control circuit 27. The condition code register 15 preserves the condition of the CPU which has executed the addition instruction as stated above.

The peripheral address latch 25 indicates an address of the peripheral circuit, not shown, and this address is fed to the peripheral circuit by way of the peripheral address bus PAB.

An addition instruction is executed as outlined above. When the objects of operation exist within the internal resource 10 having the accumulator 12, B register 13, stack pointer 14 and so forth, the instruction decoder 23 delivers control signals such that data stored in registers of interest of the internal resource 10 are read out and fed to the internal bus 11, instead of data being fetched via the peripheral data bus PDB. Then, instruction processing cycles will be executed in the same manner as with the addition instruction.

With the illustrative embodiment, therefore, external peripheral circuits interconnected to the peripheral data bus PDB can be dealt with in the same manner as the internal resource 10 with respect to timing. This is successful in enhancing the efficient manipulation of peripheral circuits. Moreover, an oscillation circuit, a CPU control circuit for executing stops, halts and other similar power-down control, a ROM, a RAM, an interruption circuit and other various kinds of cicuitry are connectable to the CPU core as peripheral circuits. Hence, peripheral circuits can be designed to meet particular market needs, whereby design freedom is enhanced.

Generally, while a CPU having a single bus structure promotes the reduction of chip size and the ease of pattern layout, the execution of an instruction with such a CPU involves a period during which the fetching of an instruction and the execution of an instruction fetched previously overlap each other (e.g. a period of time Tb extending over successive timing stages S4 and S1 as shown in FIG. 2. To eliminate this undesirable period, either one of the fetching of an instruction and the execution of the previous instruction has to be delayed at the sacrifice of processing rate. In the light of this, the bus control circuit 27 of the illustrative embodiment has a unique construction as shown in FIG. 3.

Figure 3:
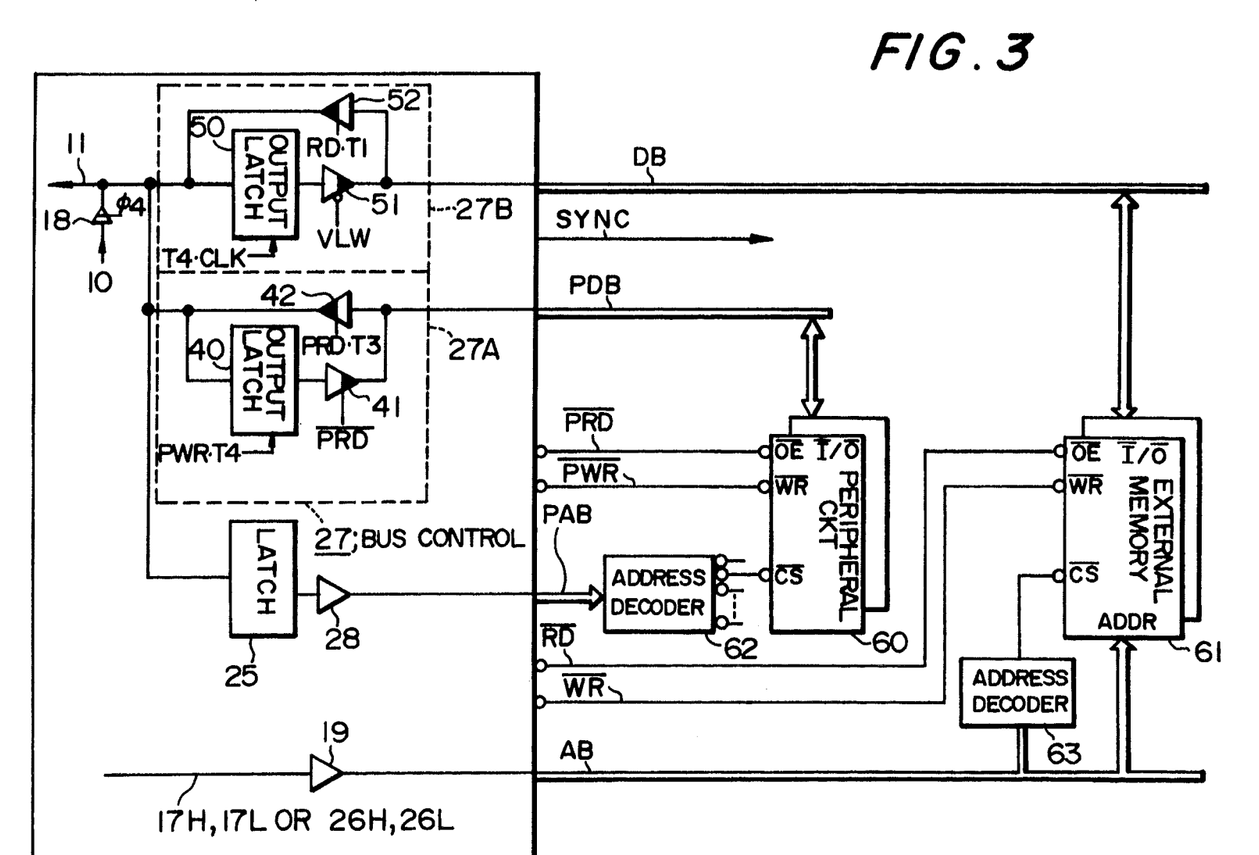
FIG. 3 is a block diagram schematically showing a specific construction of a bus control circuit included in the CPU core of FIG. 1 and an arrangement associated therewith.

FIG. 3 shows a specific construction of the bus control circuit 27 of the CPU core of FIG. 1 and an arrangement associated therewith. In the CPU core shown in FIG. 3, the individual registers and other elements included in the internal resource 10 each is interconnected to the 8-bit internal bus 11 via respective one of a plurality of output drivers 18 which are controlled by the basic timing signal φ4. The output of the peripheral address latch 25 interconnected to the internal bus 11 is interconnected to the 8-bit peripheral address bus PAB via an output driver 28. The outputs of the program counters 17H and 17L or the outputs of the external memory address latch circuits 26H and 26L are interconnected to the address bus AB via an output buffer 19, depending on the kind of instruction to be executed.

The bus control circuit 27 is made up of a peripheral data bus control section 27A for controlling the interchange of data between the internal bus 11 and the peripheral data bus PDB, and a data bus control section 27B for controlling the interchange of data and others between the internal bus 11 and the data bus DB. The peripheral data bus control section 27A has an output latch 40 for latching data to be fed out from the internal bus 11 to the peripheral data bus PDB, an output driver 41 for controlling the output timing of data having been latched in the output latch 40, and an input driver 42 for controlling the input timing of data to be applied from the peripheral data bus PDB to the internal bus 11. The data bus control section 27B has an output latch 50 for latching data and others to be fed out from the internal bus 11 to the data bus DB, an output driver 51 for controlling the output timing of data and others having been latched by the output latch 50, and an input driver 52 for controlling the input timing of data and others to be fed from the data bus DB to the internal bus 11.

The output latch 40 latches output data in response to an output timing signal PWR·T4 associated with the timing state T4, while the output latch 50 latches output data in response to a clock signal T4·CLK associated with the state T4. The output drivers 41 and 51 are operated by an input timing signal $\overline{\text{PRD}}$ and a data output signal VLW, respectively. The input drivers 42 and 52 are respectively operated by an input timing signal PRD·T3 associated with the timing state T3 and an input timing signal RD·T1 associated with the state T1.

At the outside of the CPU core, a plurality of peripheral circuits 60 each is interconnected to the peripheral data bus PDB via a bus driver, not shown. A plurality of external memories 61 each is also interconnected to the outside of the CPU core between the address bus AB and the data bus DB via a bus driver, not shown. An address decoder 62 decodes an address on the peripheral address bus PAB and feeds the decoded address to a terminal $\overline{\text{CS}}$ of each peripheral circuit 60, whereby one of the peripheral circuits 60 is selected. Each peripheral circuit 60 has a terminal $\overline{\text{WR}}$ interconnected to a signal line on which the peripheral data output timing signal $\overline{\text{PWR}}$ appears, a terminal $\overline{\text{OE}}$ interconnected to a signal line on which the peripheral data input timing signal appears, and eight terminals I/O interconnected to the peripheral data bus PDB via the bus driver.

An address decoder 63 decodes an address on the address bus AB and delivers the decoded address to the terminals $\overline{\text{CS}}$ of the individual external memories 61 so as to select one them which is designted by the decoded address. The external memories 61 each has a terminal ADDR interconnected to the address bus AB via the associated bus driver, a terminal $\overline{\text{WR}}$ interconnected to a signal line on which the output timing signal $\overline{\text{WR}}$ appears, a terminal $\overline{\text{OE}}$ interconnected to a signal line on which the input timing signal $\overline{\text{RD}}$ appears, and eight terminals I/O interconnected to the data bus DB via the associated bus driver.

Figure 4:
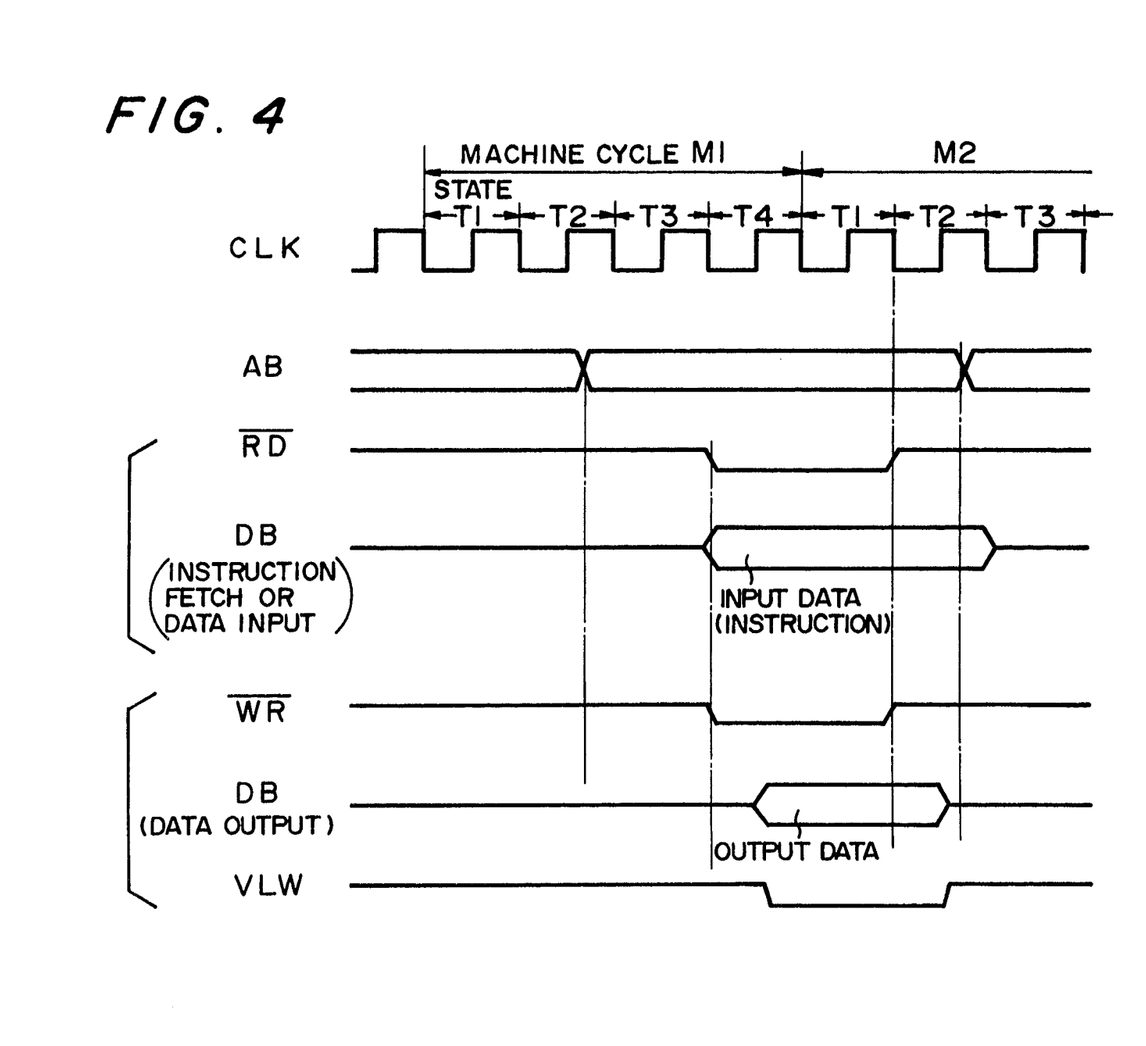
FIG. 4 is a timing chart representative of a procedure for interconnecting the bus control circuit of FIG. 3 and an external memory.
Figure 5:
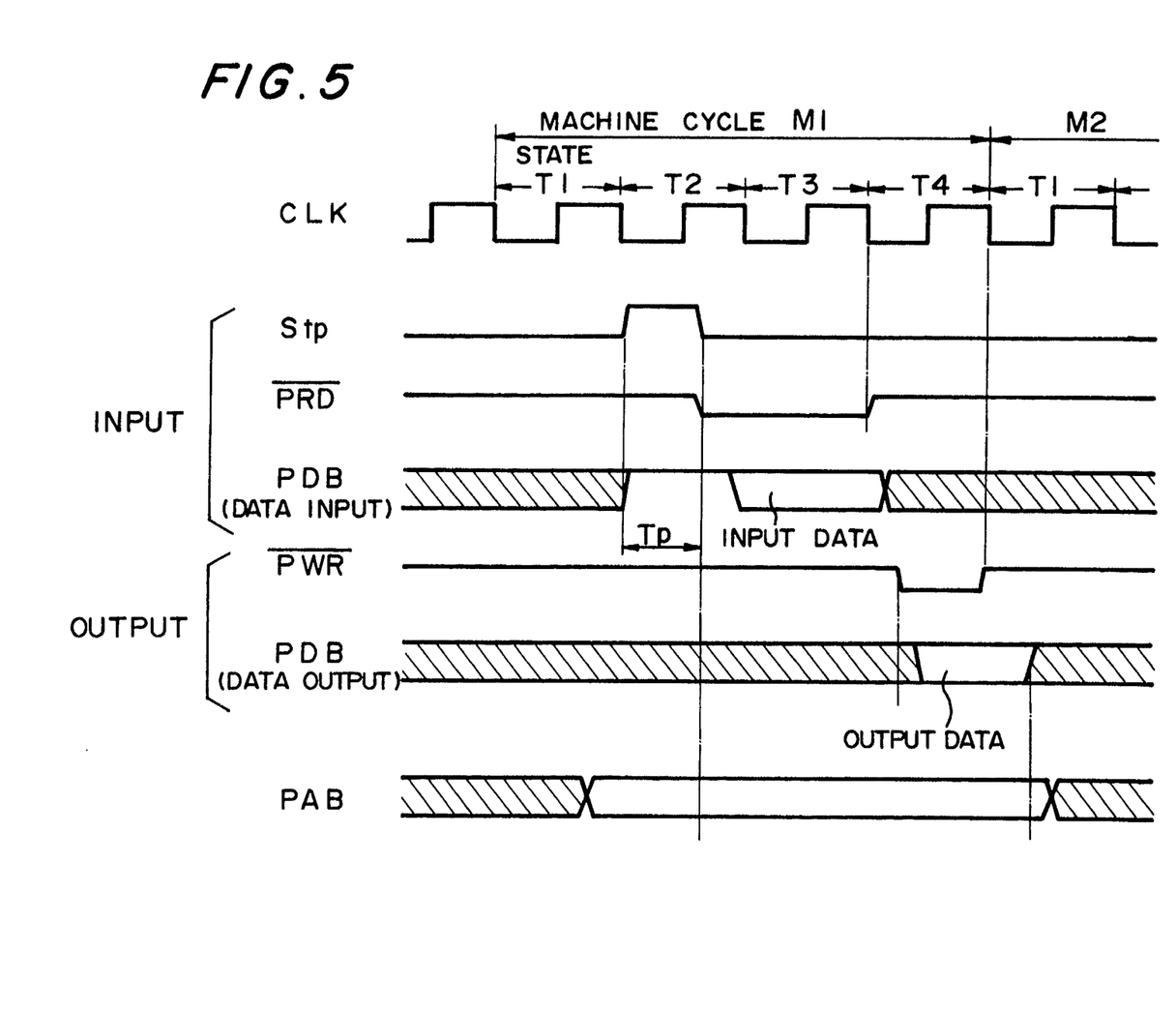
FIG. 5 is a timing chart representative of a procedure for interconnecting the bus control circuit of FIG. 3 and a peripheral circuit.

The operation of the bus control circuit 27 shown in FIG. 3 will be described with reference to FIGS. 4 and 5. Specifically, FIG. 4 is a timing chart demonstrating the interconnection of the bus control circuit 27 and any one of the external memories 61, while FIG. 5 is a timing chart representative of the interconnection of the bus control circuit 27 and any one of the peripheral circuits 60. In these figures, there are shown machine cycles M1 and M2, timing states T1 to T4, a precharge timing signal Stp, and a peripheral address PAB.

As shown in FIG. 4, as the CPU core delivers an input timing signal $\overline{RD}$ to the terminal OE of particular one of the external memories 61 for fetching an instruction, an instruction is read out of the memory 61 of interest and then applied to the input driver 52 of the bus control circuit 27B via the data bus DB. It is noteworthy that the instruction being propagated through the data bus DB is prevented from conflicting with other data because the output driver 51 is held in a high impedance state by a data output signal VLW which is in (logical) "1" level. The instruction applied to the input driver 52 is fed to the internal bus 11 at a particular timing, i.e., in the timing state T1 of the machine cycle 2 which is smaller in signal width than the input timing signal $\overline{RD}$, as shown in FIG. 4.

On the other hand, data on the internal bus 11 is delivered to the peripheral circuit 60 by the following procedure. Specifically, the data on the internal bus 11, i.e., the content of the internal resource 10 is latched in the output latch 40 via the output driver 18 in the timing state T4 of the machine cycle M1. Subsequently, as shown in FIG. 5, data existing in the period which extends from the state T4 of the machine cycle M1 to the state T1 of the next machine cycle M2 is fed out to the peripheral data bus PDB via the output driver 41 as valid data. Hence, when the CPU core feeds an output timing signal $\overline{PWR}$ to the terminal $\overline{WR}$ of the peripheral circuit 60, the data on the peripheral data bus PDB is written to the peripheral circuit 60.

With the circuit arrangement of FIG. 3, therefore, it is true that the fetching of an instruction and the execution of a previous instruction overlap each other, as viewed from the outside of the CPU core. Nevertheless, within the CPU core, output data and an instruction are fed to the internal bus 11 in the state T4 of the machine cycle M1 and in the state T1 of the machine cycle M2, respectively. This is successful in eliminating the problem of overlapping period particular to a CPU having a single bus structure as discussed previously.

Data on the internal bus 11 is delivered to the external memory 61 in the same manner as to the peripheral circuit 60. Specifically, as shown in FIG. 4, data of the internal resource 10 appearing on the internal bus 11 in the state T4 of the machine cycle M1 is latched in the output latch 50 by a signal T4-CLK which is outputted in the latter half of the state T4 of the machine cycle M1. The latched data is fed to the data bus DB by the output driver 51 which is operated by the data output signal VLW up to the state T2 of the next machine cycle M2. As a result, the data outputted to the data bus DB is written to the external memory 61 by the output timing signal $\overline{WR}$.

With the construction and timings of the bus control circuit 27 stated above, it is possible to overcome the drawback particular to a CPU having a single bus structure without lowering the instruction execution rate.

Another characteristic feature of the illustrative embodiment is as follows. The interchange of data between the CPU core and any one of the peripheral circuits 60 has to be executed in the timing states S3 and S4, as shown in FIG. 2. Assuming that the clock signal CLK has a frequency of 10 megahertz, for example, then the timing states S3 and S4 last 100 nanoseconds. The exclusive area to be occupied by the various peripheral circuits 60 which are interconnected to the CPU core has to be reduced as far as possible because they will be built in a single-chip microcomputer in the event of quantity production. Specifically, a prerequisite with the interconnection of the CPU core and the peripheral circuits 60 is that not only high-speed data interchange but also minimum space requirement be achieved.

However, the response of the peripheral data bus PDB is sequentially slowed down with the increase in the number of peripheral circuits 60 interconnected thereto due to the load capacity of the circuits 60. Here, the words "load capacity" refer to the sum of the wiring capacities of buses interconnecting the peripheral circuits 60, the capacities of bus drivers and input gates of the peripheral circuits 60, etc. Especially, the bus drivers each being built in respective one of the peripheral circuits 60 are implemented by transistors which occupy a substantial area, in order to charge and discharge the peripheral data bus PDB at high speed. Such bus drivers, therefore, have a load capacity, or output capacity, which is great enough to influence the chip size.

Considering the above situation, the illustrative embodiment further includes a unique circuit which allows a peripheral circuit to connect itself to the CPU at high speed while occupying a minimum of exclusive area, as will be described with reference to FIG. 6. This circuit is built in the bus control circuit 27 to precharge the peripheral data bus PDB. While a precharging method has heretofore been extensively practiced with dynamic RAMs, for example, the illustrative embodiment effectively applies it to a peripheral bus in the configuration which will be described.

Figure 6:
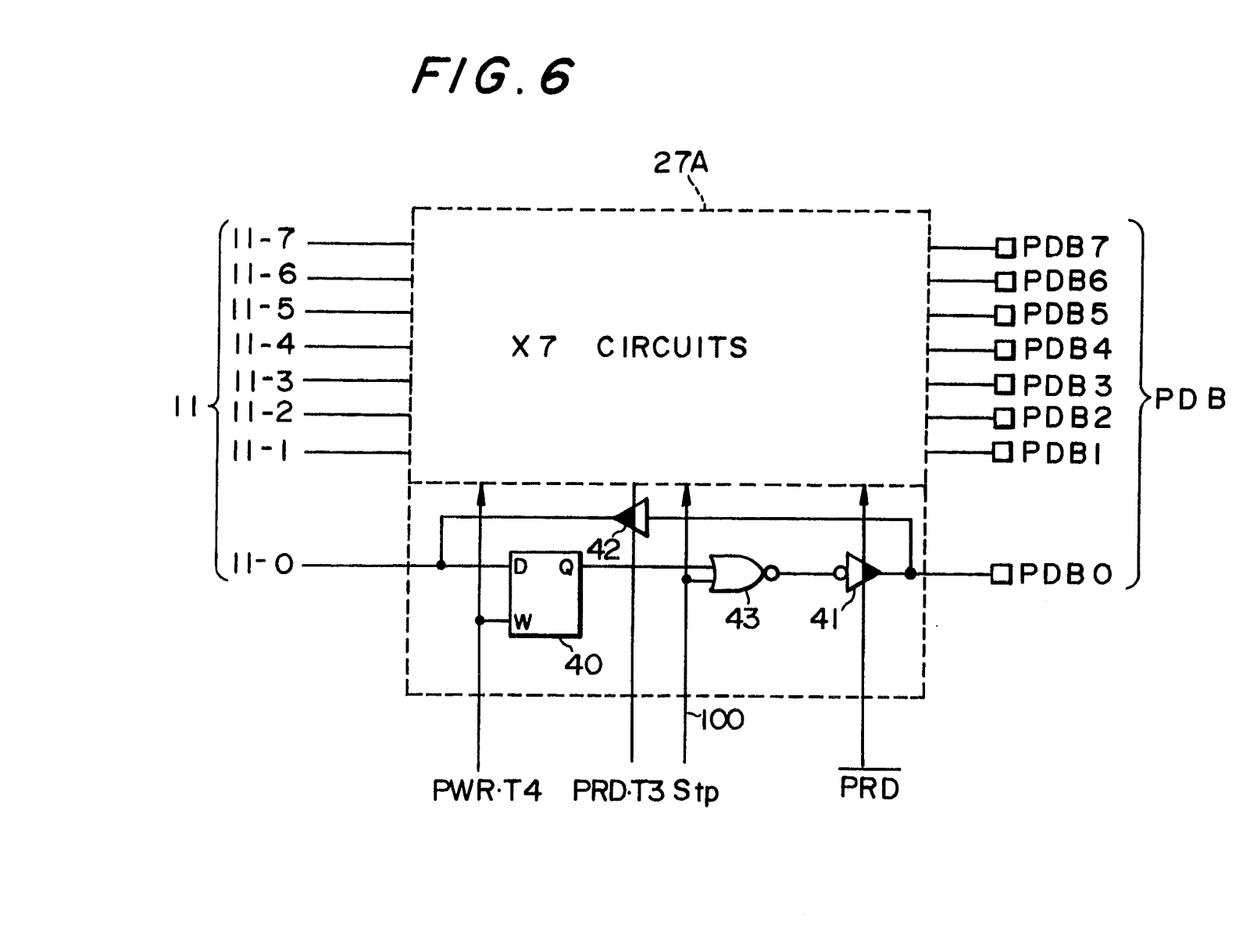
FIG. 6 is a diagram showing in detail a connection part between an internal bus included in the bus control circuit of FIG. 3 and a peripheral data bus.
Figure 7A:
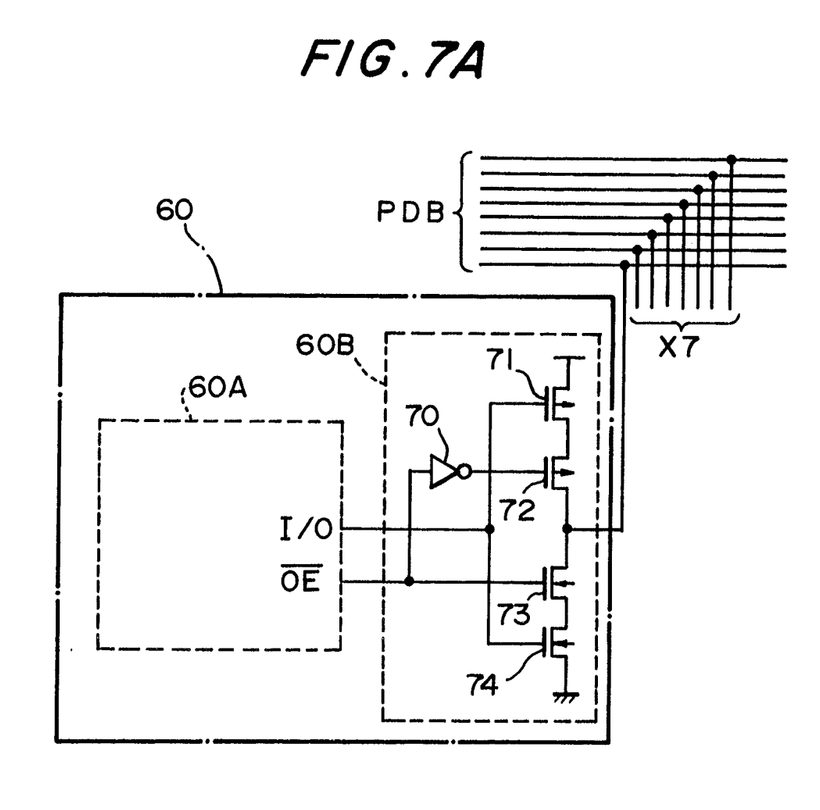
FIGS. 7A and 7B are diagrams each schematically showing a particular construction of the peripheral circuit shown in FIG. 3.
Figure 7B:
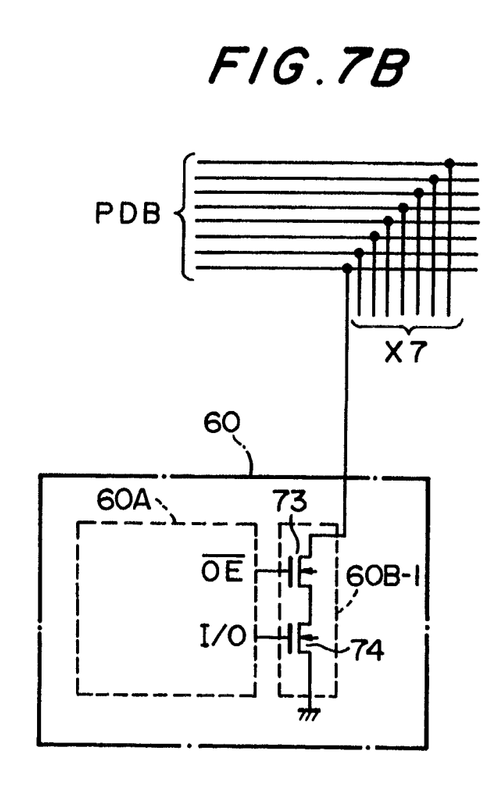

FIG. 6 is a diagram showing how the internal bus 11 and peripheral data bus PDB are interconnected in the bus control circuit 27, FIG. 3, in detail. FIGS. 7A and 7B are diagrams each showing a peripheral circuit 60, FIG. 3, having a different construction.

In the bus control circuit 27, the peripheral data bus section 27A interfaces the internal bus 11 and the 8-bit peripheral data bus PDB having bus lines PDB0 to PDB7. FIG. 6 shows a circuit portion of the peripheral data bus section 27A that interfaces a bus line 11-0 included in the internal bus 11 and the bus line PDB0 of the peripheral data bus PDB. As shown, the interfacing circuit portion has a NOR gate 43 having two inputs which are respectively interconnected to the output terminal Q of the output latch 40 and a control line 100 on which the precharge timing signal Stp appears. The output of the NOR gate 43 is interconnected to the input terminal D of the output latch 40 via the output driver 41 and input driver 42. Seven more such interfacing circuit portions are provided between the other bus lines 11-1 to 11-7 of the internal bus and the other bus lines PDB1 to PDB7 of the peripheral data bus PDB.

As shown in FIGS. 7A and 7B, a plurality of peripheral circuits 60 each having a particular construction are interconnected to the peripheral data bus PDB. Specifically, the peripheral circuit 60 of FIG. 7A has a peripheral body 60A and a bus driver 60B. The bus driver 60B has an inverter 70 which is interconnected to the terminal $\overline{OE}$ of the peripheral body 60A. P-channel MOS (PMOS) transistors 71 and 72 and n-channel MOS (NMOS) transistors 73 and 74 are interconnected in series to the terminal I/O of the peripheral body 60A and the output of the inverter 70 between the power source and ground. On the other hand, the peripheral circuit 60 of FIG. 7B has a bus driver 60B-1 which is comprised of NMOS transistors S73 and S74 only.

Referring again to FIG. 5, the operation of the circuitry shown in FIGS. 6, 7A and 7B will be described. To read data out of the peripheral circuit 60 of interest, the CPU core delivers an input timing signal $\overline{PRD}$ to the terminal $\overline{OE}$ of the peripheral circuit 60. Prior to the input timing signal $\overline{PRD}$, a precharge timing signal Stp is fed to the NOR gate 43 in the state T2 of the machine cycle MI. Then, output of the NOR gate 43 turns to (logical) "0" level and is inverted by the output driver 41 to "1" level. As a result, the output of the output driver 41 turns to "1" level and thereby precharges the bus line PDB0 of the peripheral data bus PDB0 to "1" level during a precharging period Tp.

As soon as the input timing signal $\overline{PRD}$ turns to "0" level after the bus line PDB0 has been precharged as stated above, data is read out of the peripheral circuit 60 and fed to the peripheral data section 27A via the bus line PDB0. In this instance, the input timing signal $\overline{PRD}$ is in "0" level and, therefore, the output driver 41 is in a high impedance state. Consequently, the data read out of the peripheral circuit 60 is fed to the internal bus 11-0 via the input buffer 42 in the timing state T3 of the machine cycle M1, without conflicting with other data.

As stated above, the precharging circuit built in the peripheral data bus section 27A and made up of the NOR gate 43 and output driver 41 allows a "1" level signal to be applied only to the peripheral data bus PDB while preventing the operating state of the internal bus 11 from being disturbed.

As shown in FIG. 7A, it has been customary to provide the bus driver 60B of the peripheral circuit 60 with the PMOS transistors 71 and 72 and inverter 70 for outputting a "1" level signal. In the illustrative embodiment, since a "1" level signal can be fed only to the peripheral data bus PDB due to the function of the unique precharging circuit, the PMOS transistors 71 and 72 and inverter 70 are not necessary as is the case with the bus driver 60B-1 of FIG. 7B. More specifically, the bus driver 60B-1 can be implemented only by the NMOS transistors S73 and S74. It follows that the NMOS transistors 73 and 74 do not have to be turned on when the "1" level signal is outputted, i.e., they are turned on only when the "0" level signal is outputted. The precharging circuit, therefore, reduces the load capacity of and exclusive area for a bus to less than one half of the conventional bus driver 60B.

The output timing signal $\overline{PRD}$, precharge timing signal Stp and other similar timing signals are easy to generate on the basis of the clock signal CLK and basic timing sinals $\phi 1$ to $\phi 4$ which are shown in FIG. 2.

In summary, in accordance with the present invention, a CPU core has at least an internal resource including registers, a controller for supervising the entire CPU core, and a terminal group having a plurality of terminals for interconnecting the CPU core to the outside. This, coupled with the fact that the internal resource interchanges data via an internal bus without exception, promotes efficient manipulation of peripheral circuits, reduction of the chip size, and peripheral circuit design matching manifold market needs.

A bus control circuit is interconnected between the internal bus and a data bus and a peripheral bus. When data is to be inputted to the CPU core, the width of a timing signal actually fed to the internal bus is selected to be smaller than the width of a timing signal adapted to input the data. On the other hand, when data is to be outputted, data on the internal bus is latched and then outputted. These in combination eliminate the problem particular to a CPU having a single bus structure and thereby implements rapid processing and the reduction of chip size. Further, before data to be outputted to the peripheral data bus is fetched, the peripheral data bus is precharged, and the output of the bus control circuit connected to the peripheral data bus is set up to a high impedance state in the event of the following input of the data. This desirably scales down the individual peripheral circuits and realizes the interchange of high-speed data.

The present invention, therefore, implements a CPU core which is small in chip size and has excellent peripheral circuit manipulability and unprecedented design freedom.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention. For example, registers or similar circuits may be added to the internal resource and control circuit 20 shown in FIG. 1. The terminals in the terminal group 30 may be partly omitted or may be combined with additional terminals, as desired.

What is claimed is:

1. A system comprising:
   an external bus interconnected to a peripheral circuit for supplying the peripheral circuit with data and receiving data from the peripheral circuit; and
   a single-chip microcomputer operative in response to a clock signal defining machine cycles, each of which includes at least first, second and third states;
   said single chip microcomputer including:
   an internal bus for transmitting data and an instruction thereover;
   a data processing circuit interconnected to said internal bus for processing the data appearing on said internal bus to produce data resultant from processing on said internal bus;
   a control circuit interconnected to said internal bus for controlling said data processing circuit in response to the instruction received from said internal bus;
   a precharge setting circuit for setting said external bus precharged in the first state;
   an input driver for transferring the data from said external bus to said internal bus in the second state;
   a latch circuit interconnected to said internal bus for latching therein the data appearing on said internal bus in the third state; and
   an output driver for transmitting the data latched in said latch circuit to said external bus.

2. A system according to claim 1, wherein said precharge setting circuit sets said output driver to output a high logic level signal so as to precharge said external bus in the first state.

3. A system according to claim 2, wherein said precharge setting circuit includes a NOR logic gate having first and second input terminals and an output terminal; said first input terminal receiving the data leached in said latch-circuit; and said second input terminal receiving a precharge timing signal in the first state; said output terminal being connected to an input terminal of said output driver.

4. A system according to claim 1, wherein the first state is prior to the second and third states within each of the machine cycles.

5. A system according to claim 4, wherein said precharge setting circuit sets said output driver to output a high logic level signal so as to precharge said external bus in the first state.

6. A system according to claim 5, wherein said precharge setting circuit includes a NOR logic gate having first and second input terminals and an output terminal; said first input terminal receiving the data latched in said latch circuit; and said second input terminal receiving a precharge timing signal in the first state; said output terminal being connected to the input terminal of said output driver.

7. A CPU core for a single chip microcomputer, the CPU core being connectable to on-chip circuits peripheral to the CPU core via one or more buses, the CPU core being operable to read or write signals onto or from one bus interconnected to another bus without affecting the other bus, comprising:

- a peripheral bus connected to a peripheral circuit for communicating digital signals between the CPU core and the peripheral circuit;
- a single chip microcomputer CPU core including an internal bus, an arithmetic and logic unit, and an accumulator all connected to said internal bus;
- the CPU core further including a bus control circuit coupled to said internal bus and said peripheral bus, said bus control circuit including a plurality of interface circuit portions;
- each interface circuit portion comprising:
  - a latch circuit having an input and an output, said latch input being connected to a corresponding line forming part of said internal bus,
  - a logic circuit having a first input coupled to said latch output and having a second input coupled to receive a precharge timing signal;
  - a driver circuit having an output coupled to a corresponding line of said peripheral bus and having an input coupled to the output of said logic circuit;
  - a selectively operable circuit coupling said corresponding line of said peripheral bus to the corresponding line of the internal bus;
- said interface circuit portions being configured so that said bus control circuit may be operated to receive a precharge signal and in response thereto, precharge the lines of the peripheral bus during a precharging period, then data may be communicated from the peripheral circuit via the peripheral bus to the interface circuit portions, with the circuit interface portion then selectively coupling the signals from the peripheral bus to the internal bus;
- whereby the precharging signal may be applied to the peripheral bus without disturbing the internal bus.

* * * * *